United States Patent
Li et al.

(10) Patent No.: US 12,299,968 B2
(45) Date of Patent: May 13, 2025

(54) CASCADED NEURAL NETWORK-BASED ATTENTION DETECTION METHOD, COMPUTER DEVICE, AND COMPUTER-READABLE STORAGE MEDIUM

(71) Applicant: ALLWINNER TECHNOLOGY CO., LTD., Guangdong (CN)

(72) Inventors: Xiaohui Li, Guangdong (CN); Gang Peng, Guangdong (CN); Nan Nan, Guangdong (CN); Liping Ye, Guangdong (CN)

(73) Assignee: ALLWINNER TECHNOLOGY CO., LTD., Guangdong (CN)

( * ) Notice: Subject to any disclaimer, the term of this patent is extended or adjusted under 35 U.S.C. 154(b) by 681 days.

(21) Appl. No.: 17/631,083

(22) PCT Filed: Jul. 30, 2019

(86) PCT No.: PCT/CN2019/098407
§ 371 (c)(1),
(2) Date: Mar. 24, 2022

(87) PCT Pub. No.: WO2021/016873
PCT Pub. Date: Feb. 4, 2021

(65) Prior Publication Data
US 2022/0277558 A1     Sep. 1, 2022

(51) Int. Cl.
*G06V 10/00*     (2022.01)
*G06V 10/22*     (2022.01)
(Continued)

(52) U.S. Cl.
CPC .............. *G06V 10/82* (2022.01); *G06V 10/22* (2022.01); *G06V 20/41* (2022.01); *G06V 20/597* (2022.01); *G06V 40/161* (2022.01)

(58) Field of Classification Search
CPC ........ G06V 10/82; G06V 10/22; G06V 20/41; G06V 20/597; G06V 40/161; G06V 40/18; G06V 10/25; G06V 10/809; G06F 18/214

See application file for complete search history.

(56) References Cited

U.S. PATENT DOCUMENTS

2019/0065873 A1* 2/2019 Wang .................. G06V 40/168
2019/0138268 A1* 5/2019 Andersen .......... G06F 16/90332
(Continued)

FOREIGN PATENT DOCUMENTS

| CN | 108664947 | 10/2018 |
|---|---|---|
| CN | 109598174 | 4/2019 |

(Continued)

*Primary Examiner* — Md K Talukder
(74) *Attorney, Agent, or Firm* — COZEN O'CONNOR

(57) ABSTRACT

The present invention provides an attention detection method based on a cascade neural network, a computer apparatus, and a computer-readable storage medium. The method includes: obtaining video data, recognizing a plurality of image frames, and extracting a face region of the plurality of image frames; recognizing the face region by using a first convolutional neural network to judge whether a first situation of inattention occurs; and recognizing, if it is confirmed that no first situation of inattention occurs, the face region by using a second convolutional neural network to judge whether a second situation of inattention occurs, where computational complexity of the first convolutional neural network is less than computational complexity of the second convolutional neural network. The present invention further provides the computer apparatus for implementing the foregoing method and the computer-readable storage medium.

9 Claims, 3 Drawing Sheets

(51) Int. Cl.
 G06V 10/82 (2022.01)
 G06V 20/40 (2022.01)
 G06V 20/59 (2022.01)
 G06V 40/16 (2022.01)

(56) References Cited

U.S. PATENT DOCUMENTS

| | | | |
|---|---|---|---|
| 2019/0283762 A1* | 9/2019 | el Kaliouby | G06V 20/597 |
| 2021/0012128 A1* | 1/2021 | Wang | G06Q 10/00 |
| 2022/0129664 A1* | 4/2022 | Li | G06V 40/193 |
| 2022/0180110 A1* | 6/2022 | Yang | G06V 20/46 |
| 2022/0277558 A1* | 9/2022 | Li | G06V 10/22 |
| 2022/0327845 A1* | 10/2022 | Rundo | G06V 10/7715 |
| 2023/0154207 A1* | 5/2023 | Qi | G08B 21/06 |
| | | | 382/157 |

FOREIGN PATENT DOCUMENTS

| | | |
|---|---|---|
| CN | 109740477 | 5/2019 |
| JP | 4967559 | 7/2012 |

\* cited by examiner $$P_i = \frac{e^i}{\sum_j e^j}, i = 1, 2, \cdots, n$$
FIG. 2
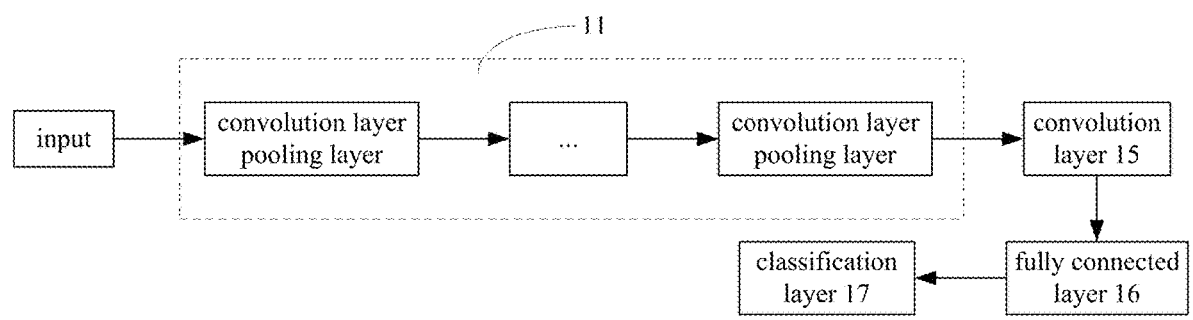
FIG. 3
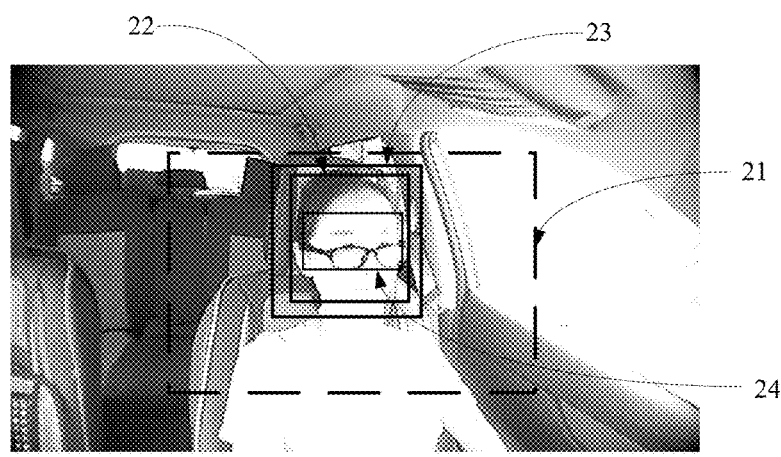
FIG. 4

CASCADED NEURAL NETWORK-BASED ATTENTION DETECTION METHOD, COMPUTER DEVICE, AND COMPUTER-READABLE STORAGE MEDIUM

PRIORITY CLAIM

This is a U.S. national stage of application No. PCT/CN2019/098407, filed on Jul. 30, 2019, the content of which is incorporated herein by reference.

TECHNICAL FIELD

The present invention relates to the field of image recognition processing, and in particular, to an attention detection method based on a cascade neural network, a computer apparatus and a computer-readable storage medium for implementing the method.

BACKGROUND

With the development of the intelligent technology, detecting human attention by image recognition has become a cutting-edge emerging technology. Human attention detection has always been one of focuses and hotspots in the field of machine learning, and is mainly used in aspects such as security protection and aided driving. Due to a large number of uncertain factors in a real environment, such as the influence of different illumination conditions such as day and night, diversity of human head postures and expressions, and differences in race, gender and age, as well as human wearing of glasses, detecting a human attention state in the real environment is quite challenging.

In view of this, how to improve human attention detection performance has become a hotspot in the field of artificial intelligence research, and many algorithms have been proposed therefore. For example, remote eye tracking is a classical algorithm for detecting human attention. In an outdoor environment, this method needs to rely on a near-infrared lighting device to produce a bright pupil effect, so as to capture eye information. However, the near-infrared lighting device used in this method is easily damaged due to vibration and bumps, and needs long-term maintenance, which is relatively high in cost.

Therefore, some researchers have proposed to rely on head postures and eye information to detect human attention. One solution is to fuse the head postures, eye features and geometric features of a vehicle, and then classify regions concerned by human eyes to implement the detection of human attention. This method has achieved a good effect. Another method of combining head postures with eye features is to classify regions concerned by human eyes. However, the foregoing two methods have two main problems. The first is that a series of complex operations such as face detection, face calibration, eyeball detection and feature extraction are required, and if a submodule in this algorithm has poor performance, it will inevitably affect an overall effect. The second is that when features are extracted, an adopted conventional machine learning method and conventional feature extraction algorithm have a poorer generalization capability. For example, when a photographing angle of a camera, external illumination conditions and a position of a target change, the performance of this method drops sharply.

Therefore, some researchers have proposed a method of attention estimation based on a convolutional neural network. The method may be used to automatically learn information of head posture features and eye features from data samples, without manually designing a feature extraction algorithm, and has good robustness. However, a model of the convolutional neural network used is large in size and high in computational complexity, which is not suitable for an embedded device, resulting in great limitations on the use of this method.

SUMMARY

A main objective of the present invention is to provide an attention detection method based on a cascade neural network, which has low computational complexity and good computational performance.

Another objective of the present invention is to provide a computer apparatus for implementing the foregoing attention detection method based on a cascade neural network.

Still another objective of the present invention is to provide a computer-readable storage medium for implementing the foregoing attention detection method based on a cascade neural network.

Technical Solutions

To achieve the main objective of the present invention, an attention detection method based on a cascade neural network provided in the present invention includes: obtaining video data, recognizing a plurality of image frames, and extracting a face region of the plurality of image frames; recognizing the face region by using a first convolutional neural network to judge whether a first situation of inattention occurs; and recognizing, if it is confirmed that no first situation of inattention occurs, the face region by using a second convolutional neural network to judge whether a second situation of inattention occurs, where computational complexity of the first convolutional neural network is less than computational complexity of the second convolutional neural network.

In a preferred solution, the recognizing the face region by using a second convolutional neural network includes: capturing a plurality kind of regions of interest from the face region, and judging whether a second situation of inattention occurs according to a result of recognition of two or more kind regions of interest.

In a further solution, the plurality kind of regions of interest include a face frame region and a face supplement region; and the judging whether a second situation of inattention occurs according to a result of recognition of two or more kind regions of interest includes: judging whether a second situation of inattention occurs according to a result of image recognition of the face frame region and the face supplement region.

In a still further solution, the plurality kind of regions of interest include a face frame region and an eye region; and the judging whether a second situation of inattention occurs according to a result of recognition of two or more kind regions of interest includes: judging whether a second situation of inattention occurs according to a result of image recognition of the face frame region and the eye region.

In a still further solution, the judging whether a first situation of inattention occurs includes: recognizing the face region by using the first convolutional neural network, judging whether a rotation angle of the head in a preset direction is greater than a preset angle, and if so, confirming that the first situation of inattention occurs.

In a still further solution, the second convolutional neural network includes a first convolution layer, a depthwise convolution layer, a plurality of bottleneck residual layers, a second convolution layer, a linear global depthwise convolution layer, a linear convolution layer, a fully connected layer and a classification layer that are sequentially cascaded.

In a still further solution, the bottleneck residual layer includes a convolution unit and a depthwise convolution unit for receiving an output of the convolution unit, and is further provided with a residual unit, and the residual unit implements residual computation of the bottleneck residual layer when a step size of the convolution unit is 1.

In a still further solution, the recognizing a plurality of image frames after obtaining the video data includes: selecting one image frame from every preset number of consecutive image frames of the video data for recognition.

To achieve another objective, a computer apparatus provided in the present invention includes a processor and a memory, where the memory stores a computer program, and when the computer program is executed by the processor, each step of the foregoing attention detection method based on a cascade neural network is implemented.

To achieve still another objective, a computer-readable storage medium provided in the present invention stores a computer program, where when the computer program is executed by a processor, each step of the foregoing attention detection method based on a cascade neural network is implemented.

Beneficial Effects

In the applied solution of the present invention, after a face region of a plurality of image frames is extracted, recognition is first performed by using a first convolutional neural network to judge whether a first situation of inattention occurs, and only when it is confirmed that no first situation of inattention occurs, recognition is performed by using a second convolutional neural network to judge whether a second situation of inattention occurs. This may avoid using a convolutional neural network having a relatively complicated degree of computation for all situations, thereby simplifying the overall complexity of the attention detection.

In addition, in the solution of the present invention, when whether the second situation of inattention occurs is judged by using the second convolutional neural network, the face region is divided into a plurality kind of regions of interest, the plurality kind of regions of interest are separately recognized, and then fusion analysis is performed in conjunction with the recognition of the plurality kind of regions of interest to judge whether the second situation of inattention occurs. This may improve accuracy of analysis, and have a better effect of recognizing inattention.

Specifically, by recognizing a face frame region and a face supplement region separately, a plurality of attention situations of people, such as a situation that a driver is looking at a left rearview mirror, looking at the front, looking at a vehicle interior rearview mirror, looking at a right rearview mirror, looking at a dashboard, looking at a central control region, or closing eyes, may be recognized. By combination with a result of recognition of the face frame region and the face supplement region, it can be judged whether the driver is distracted in driving or wants to change a lane in driving. When several consecutive face images fall into situations of looking at the vehicle interior rearview mirror, looking at the dashboard and looking at the central control region, it can be judged that the driver is distracted in driving, and when several consecutive face images fall into situations of looking at the left rearview mirror and looking at the front, it can be judged that the driver wants to change a lane in driving.

Whether the driver is fatigue in driving, is distracted in driving or wants to change a lane in driving can be judged by using the result of recognition of the face frame region and the face supplement region. When several consecutive face images fall into the situation of closing eyes, it can be judged that the driver is fatigue in driving. When several consecutive face images fall into a situation of being deviated to the left side or right side and looking at the left side or the right side, it can be considered that the second situation of inattention occurs.

To judge whether the first situation of inattention occurs to the driver, it is required only to judge whether a rotation direction of the driver's head is greater than a preset angle, for example, when the head rotates upward, downward, leftward or rightward by more than 60°, it can be considered that the first situation of inattention occurs. In this way, the design of the first convolutional neural network is very simple, and the computation amount is smaller Once it is judged that the first situation of inattention occurs, it is not required to judge the second situation, and the overall computation amount of inattention judging can be saved.

However, the computation amount of the second convolutional neural network is relatively complex and can be used to accurately recognize whether other situations of inattention occur to the driver, and the judgment is more accurate.

In addition, because images of successive frames in the obtained video data are very similar, the recognition of all frames will lead to a huge computation amount, and a large number of similar calculations will result in substantially the same calculation results. Therefore, only one image frame is selected from every set number of consecutive image frames to be recognized, which can greatly reduce the computation amount of inattention recognition, and can ensure the accuracy of recognition results. Preferably, one image frame may be selected from every six image frames for recognition.

BRIEF DESCRIPTION OF DRAWINGS

FIG. 2 shows a formula for calculating a softmax probability value of a value in an embodiment of an attention detection method based on a cascade neural network according to the present invention;

FIG. 3 is a structural block diagram of a first convolutional neural network in an embodiment of an attention detection method based on a cascade neural network according to the present invention;

FIG. 4 is a schematic diagram of four regions of interest for image recognition by using an embodiment of an attention detection method based on a cascade neural network according to the present invention;

The present invention is further described below in conjunction with the accompanying drawings and embodiments.

DESCRIPTION OF EMBODIMENTS

An attention detection method based on a cascade neural network according to the present invention is applied to an intelligent device. Preferably, the intelligent device is provided with a photographing apparatus, such as a camera. The intelligent device uses video data obtained by the photographing apparatus to perform image analysis, so as to judge whether a situation of inattention occurs to a specific person. Preferably, the intelligent device is provided with a processor and a memory storing a computer program, where the processor implements the attention detection method based on a cascade neural network by executing the computer program.

Embodiment of an attention detection method based on a cascade neural network

This embodiment is mainly based on head postures and eye information, and a cascade convolutional neural network is applied to detect attention of a specific person. The entire method mainly includes three steps: video collection, image processing, and attention detection.

In the video collection step, video data is photographed by the photographing apparatus. In this embodiment, recognition can be performed on the basis of the video data of different scenarios (including different photographing angles, external illumination conditions, a position of a target, and the like). Therefore, the photographing apparatus can obtain target video data in various different postures. In the image processing step, a plurality of image frames are obtained from the video data, the frames are detected by using a face detection algorithm, and images of a face region are captured. In the attention detection step, a first convolutional neural network with low computational complexity is first used to judge head postures of a detected object, so as to achieve a preliminary judgment of attention detection; then, the detected face region of interest is further captured and expanded, a second convolutional neural network with high computational complexity is used to extract information of head posture features and eye features, and human behavior is judged by analyzing the human gaze direction. The cascade convolutional neural network adopted in this embodiment has good generalization performance and low computational complexity, and is suitable for an embedded device.

Figure 1:
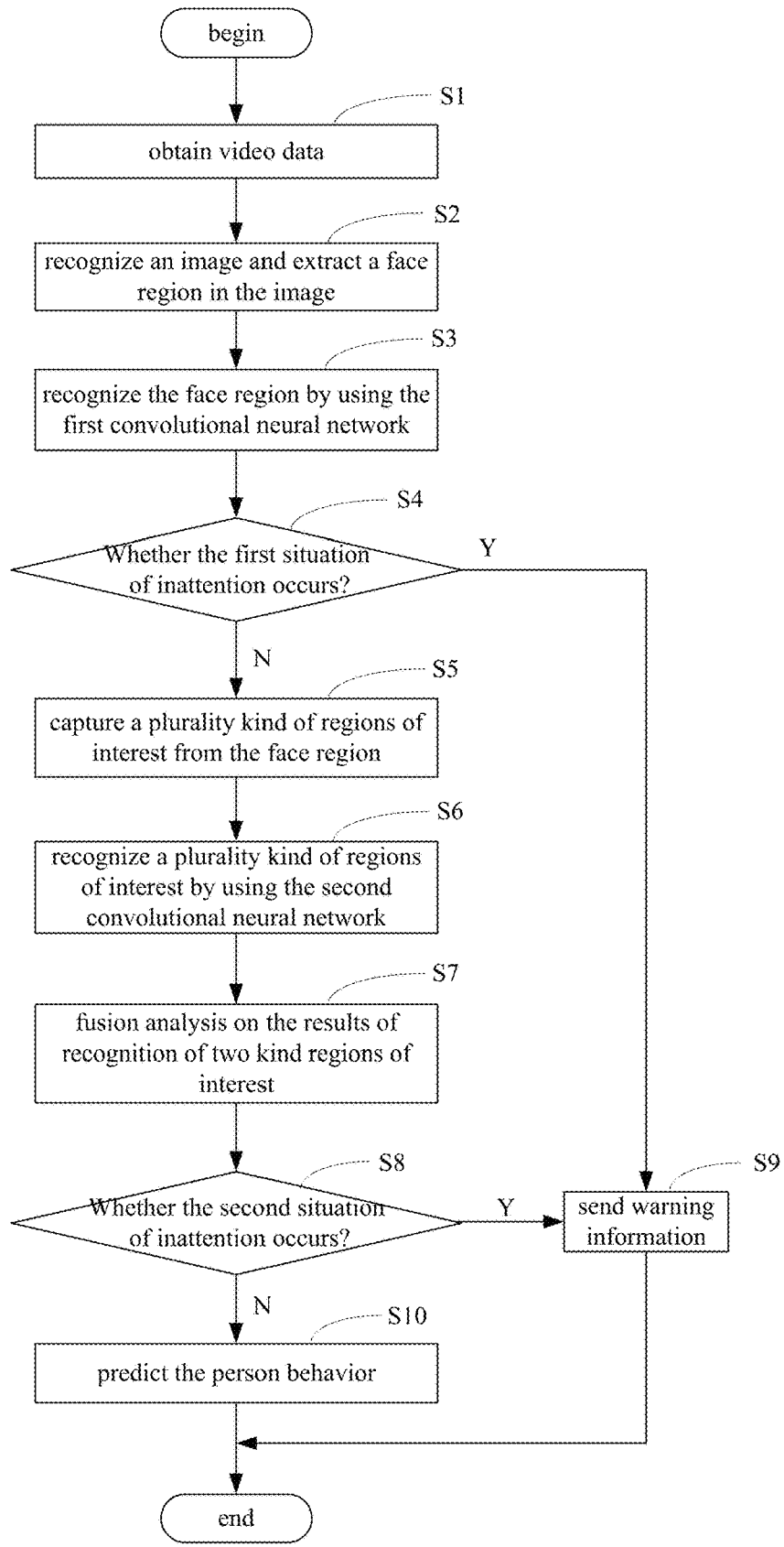
FIG. 1 is a flowchart of an embodiment of an attention detection method based on a cascade neural network according to the present invention.

A specific operating method of this embodiment is described below in conjunction with FIG. 1. Step S1 is performed first to obtain video data, that is, the photographing apparatus of the intelligent device obtains consecutive video data. Specifically, the intelligent device may be a device disposed in a vehicle to detect whether the driver is inattentive, and the photographing apparatus may be disposed in front of the driver's seat or in side front of the driver's seat, for example, below a sun visor of the driver's seat or above a center console. The photographing apparatus may start recording a video after a vehicle engine is started, and transmit obtained consecutive video data to the processor, and the processor processes the video data.

Then, step S2 is performed to recognize an image and extract a face region in the image. Because the video data obtained in step S1 includes a plurality of consecutive image frames, step S2 is to recognize the plurality of received image frames. However, because images of the plurality of consecutive image frames are very similar, the recognition of all image frames will lead to a very huge computation amount. In addition, results of recognition of a plurality of adjacent image frames are often the same. Therefore, in this embodiment, one image frame may be selected from every set number of consecutive image frames for recognition. For example, one image frame is selected from every six or eight image frames for recognition, that is, face detection is performed on this image frame, and the detected face region is captured. Specifically, the process of face detection is a process of confirming positions, sizes and postures of all faces in an image under the assumption that one or more faces exist in the input image. This process may be implemented by using the currently known face detection algorithm, and will not be described in detail herein.

Then, attention detection is performed on the extracted face region. Specifically, step S3 to step S10 are performed. In this embodiment, a cascade convolutional neural network is used to recognize images. Specifically, the cascade convolutional neural network includes a first convolutional neural network and a second convolutional neural network, where the first convolutional neural network is used to judge head postures of the detected object, so as to achieve the preliminary judgment of attention, that is, to judge whether the first situation of inattention occurs. The second convolutional neural network is used to extract the information of the head posture features and the eye features, and then judge human behavior by analyzing the human gaze direction to implement attention detection.

Specifically, step S3 is performed first to recognize the face region by using the first convolutional neural network. Specifically, in this embodiment, an attention concentration state of the detected object is judged by using a detection model which is trained in advance, for example, a situation in which the head of the detected object is rotated by more than a certain angle may be set to be a first situation of inattention. For example, a situation in which the driver turns the head leftward (by greater than 60°), turns the head rightward (by greater than 60°), raises the head (by greater than 60°) or lower the head (by greater than 60°) is a situation of inattention.

Therefore, a recognition task of the first convolutional neural network is relatively simple and easy to distinguish. The first convolutional neural network is a convolutional neural network with a small size and low computational complexity. Referring to FIG. 3, the first convolutional neural network of this embodiment includes several convolution layers, several pooling layers, a fully connected layer 16 and a classification layer 17. Each pooling layer is located between two adjacent convolution layers. As shown in FIG. 3, a dashed box 11 includes units formed by combining a plurality of convolution layers and pooling layers. Each unit includes one convolution layer and one pooling layer, and an output of the last pooling layer is input to the convolution layer 15, so that the number of the convolution layers is greater than the number of the pooling layers by one.

In this embodiment, two kinds of parameters of a plurality of convolution layers are provided. One kind of parameters of the convolution layers is as follows: m filters are provided, a convolution kernel size is $k_1 \times k_1$, and a step size pixel is $S_1$; and the other kind of parameters of the convolution layers is as follows: n filters are provided, a convolution kernel size is $k_2 \times k_2$, and a step size pixel is $S_2$. Each pooling layer samples the output of the previous convolution layer. The fully connected layer 16 is configured to implement the process of transforming a two-dimensional feature matrix output by the convolution layer 15 into a one-dimensional feature vector. The classification layer 17, as the last layer of the first convolutional neural network, uses a softmax function to map outputs of a plurality of neurons into a (0, 1) interval, which may be understood as a probability distribution. Assuming that a probability distribution vector is P, and Pi denotes an $i^{th}$ value in P, the definition of the softmax probability value of this value is shown in the formula of FIG. 2.

A maximum value is found in P, and a category corresponding to i with the highest probability is used as a detection result. The detection result is whether the rotation angle of the driver's head exceeds the preset angle.

Then, step S4 is performed to judge whether the detection result of step S3 is that the rotation angle of the driver's head exceeds the preset angle. If so, it is confirmed that the first situation of inattention occurs to the driver. In this case, step S9 is performed to send warning information, such as voice warning information.

If it is confirmed that no first situation of inattention occurs, the second convolutional neural network is applied to judge whether a second situation of inattention occurs. Specifically, step S5 is performed first to capture a plurality kind of regions of interest from the face region. Referring to FIG. 4, with the driver sitting in a driving position as an example, a first kind region of interest is implemented by directly obtaining embedded face field of vision, and corresponding human image information is a part between a rearview mirror and a mirror on the left of the driver, an image part in a dashed box 21. In the first kind region of interest, the human attention can be judged directly by using image information without face detection operations. A second kind region of interest is implemented by using the known face detection algorithm to detect and capture a face frame as an input image, an image region within a solid box 22. The second kind region of interest may be referred to as the face frame region. A third kind region of interest is implemented by expanding the detected face frame in four directions, up, down, left and right, and adding information of an additional face part based on the second kind region of interest, such as an image region in a solid box 23 in the figure. The third kind region of interest may be referred to as the face supplement region. In a method for capturing the third kind region of interest, additional auxiliary features are added, which can not only confirm the position of the human head, but also has very good robustness. A fourth kind region of interest is implemented by capturing only an upper half of the face based on the second kind region of interest, such as an image region in a solid box 24 in FIG. 4. Therefore, the fourth kind region of interest is the eye region, and is mainly used to judge the driver's attention by paying attention to eye information.

Then, step S6 is performed to recognize a plurality kind of regions of interest by using the second convolutional neural network. For example, an attention detection model which is trained in advance is used to recognize a plurality kind of regions of interest and classify recognition results. With the driver sitting in the driving position as an example, the attention of the detected object falls into seven categories, namely, looking at a left rearview mirror, looking at the front, looking at a vehicle interior rearview mirror, looking at a right rearview mirror, looking at a dashboard, looking at a central control region, and closing eyes. In other application scenarios, the attention of the detected object may fall into six categories, namely, looking at the left side, looking at the right side, looking at the front, looking above, looking down, and closing eyes.

Figure 5:
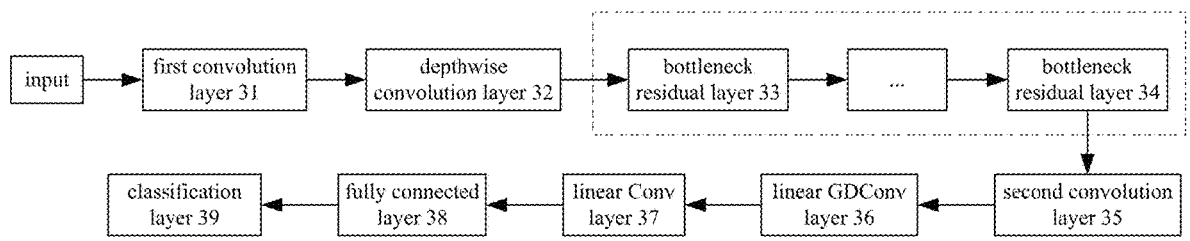
FIG. 5 is a structural block diagram of a second convolutional neural network in an embodiment of an attention detection method based on a cascade neural network according to the present invention.

Recognition and classification tasks in step S6 are relatively complex, and it is especially difficult to distinguish between connected regions such as the front and an instrument panel. Therefore, in this embodiment, a convolutional neural network with a strong learning capability and a fast calculation speed is used for recognition, that is, the second convolutional neural network is used to implement the foregoing recognition operation. Referring to FIG. 5, the second convolutional neural network in this embodiment includes a first convolution layer 31, a depthwise convolution layer 32, several bottleneck residual layers, a second convolution layer 35, a linear global depthwise convolution (linear GDConv) layer 36, a linear convolution (linear Conv) layer 37, a fully connected layer 38, and a classification layer 39 that are sequentially cascaded. A dashed box in FIG. 5 denotes a unit composed of a plurality of bottleneck residual layers. For example, the plurality of bottleneck residual layers include bottleneck residual layers 33, 34, and the like. For the $i^{th}$ bottleneck residual layer, the bottleneck residual layer is repeated $n_i$ times, the number of channel expansions at each layer is ti, and the step size is $s_i$.

In this embodiment, parameters of the first convolution layer 31 and the second convolution layer 35 may be different. Parameters of one convolution layer are as follows: m filters are provided, a convolution kernel size is $k_1 \times k_1$, and a step size pixel is $S_1$; and parameters of the other convolution layer are as follows: n filters are provided, a convolution kernel size is $k_2 \times k_2$, and a step size pixel is $S_2$.

The depthwise convolution layer 32 performs a convolution operation on each input channel with a convolution kernel of the corresponding channel Assuming that an input dimension is m, and a size is w×h, m filters corresponding to the convolution layer are provided, the convolution kernel size is k×k, and a depthwise convolution operation is used. In this case, an output dimension is m, and the size is w'×h'.

Figure 6:
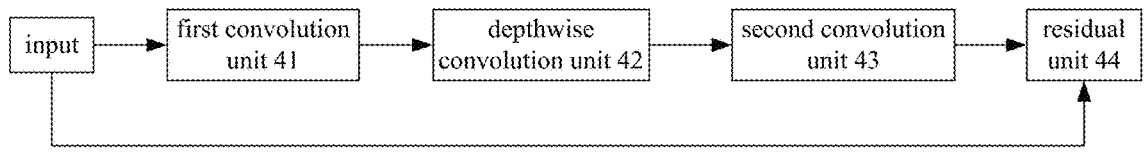
FIG. 6 is a structural block diagram when a step size of a bottleneck residual layer of a second convolutional neural network is 1 in an embodiment of an attention detection method based on a cascade neural network according to the present invention.

Each bottleneck residual layer includes a convolution unit, a depthwise convolution unit, and a residual unit. The depthwise convolution unit is configured to receive an output of the convolution unit. When the step size of the residual unit at the convolution unit is 1, residual computation of the bottleneck residual layer is implemented. As shown in FIG. 6, when the step size of the residual unit at the convolution unit is 1 and c' channels are provided, values on corresponding channels of the inputs and outputs are added to implement residual computation, that is, input data passes through a first convolution unit 41, a depthwise convolution unit 42, a second convolution unit 43 and a residual unit 44 that are sequentially cascaded, and cumulative calculation of inputs and outputs is implemented at the residual unit 44.

Figure 7:
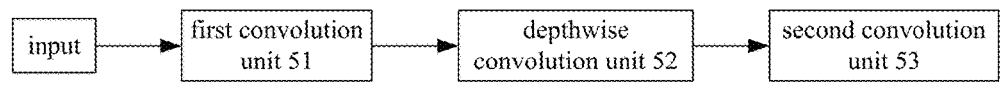
FIG. 7 is a structural block diagram when a step size of a bottleneck residual layer of a second convolutional neural network is 2 in an embodiment of an attention detection method based on a cascade neural network according to the present invention.

When the step size of the residual unit at the convolution unit is 2 and c' channels are provided, an input dimension is [w, h] and an output dimension is [w', h] Because the input dimension is not equal to the output dimension, residual computation is not performed in this case. The structural block diagram in this case is shown in FIG. 7. The input passes through a first convolution unit 51, a depthwise convolution unit 52 and a second convolution unit 53 in sequence and then is output.

The convolution kernel size of the linear global depthwise convolution layer 36 is the same as the input size. m filters are provided and the convolution kernel size is k×k. In this case, n input channels are provided and the size is k×k. After the linear global depthwise convolution computation, m output channels are provided and the size is 1×1.

The linear convolution layer 37 is a convolution layer in a special form, and uses a linear function as its activation function. A calculation process of the fully connected layer 38 is a process of converting a two-dimensional feature matrix output by an upper layer into a one-dimensional feature vector, and the output dimension is the same as the number of classifications. The calculation method for the classification layer 39 is the same as the calculation method for the classification layer 17 of the first convolutional neural network, and is not described in detail herein.

Then, step S7 is performed to perform fusion analysis on the results of recognition of four kind regions of interest according to step S6 to obtain results of fusion analysis. Specifically, with the driver sitting in the driving position as an example, when the results of recognition of the second kind region of interest and the third kind region of interest are utilized to perform fusion analysis, the face detection algorithm is first used to detect the face region, and a corresponding face frame image is captured to achieve the classification of a face frame; then the captured face frame is expanded in four directions to obtain a new image to achieve the classification of the new image, and whether the driver is distracted in driving or wants to change a lane in driving can be judged by using the results of the two classifications. When several consecutive face images fall into situations of looking at the interior rearview mirror, looking at the dashboard, and looking at the central control region, it can be judged that the driver is distracted in driving. When several consecutive face image fall into situations of looking at the left rearview mirror and looking at the front, it can be judged that the driver wants to change a lane in driving.

For another example, when the results of recognition of the second kind region of interest and the fourth kind region of interest are utilized to perform fusion analysis, the face detection algorithm is first used to detect the face region, and a corresponding face frame image is captured to achieve the classification of a face frame. Then an upper half of the face frame is retained, that is, information of the eye region is obtained, and the eye information is classified. Fusion analysis is performed by using the results of classification of the two, so that it can be judged whether the driver is fatigue in driving, is distracted in driving or wants to change a lane in driving. When several consecutive face images fall into the situation of closing eyes, it can be judged that the driver is fatigue in driving. Optionally, this method may also be applied to other scenarios, such as the detection of students' attention in class. In conjunction with the results of recognition of the second kind region of interest and the fourth kind region of interest, when several consecutive face images fall into a situation of being deviated to the left or right and looking at the left side or right side, it can be considered that a situation of inattention occurs.

Then, step S7 is performed to judge whether a second situation of inattention, such as a situation of being fatigue in driving or being distracted in driving occurs according to the analysis result of step S6. If so, step S9 is performed to send warning information; otherwise, step S10 is performed to predict the driver's behavior according to the analysis result of step S7, such as wanting to change a lane to the left in driving. The result of prediction may be provided to other algorithms for use. For example, in the field of aided driving, when it can be judged according to the result of step S7 that the driver wants to change a lane to the left in driving, a situation of vehicles coming from behind the left side, such as whether there is a driving vehicle within a certain distance behind the left side, can be detected, so as to send indication information to the driver.

Optionally, the second convolutional neural network may be replaced with a more lightweight network architecture with strong computing power, such as ShuffleNet, or bottleneck residual layers of the convolutional neural network may be reduced to retrain the model.

Embodiment of a computer apparatus:

The computer apparatus of this embodiment may be an intelligent device, such as a vehicle-mounted monitoring instrument with an image processing capability. The computer apparatus includes a processor, a memory, and a computer program stored in the memory and executable on the processor. When the processor executes the computer program, each step of the foregoing attention detection method based on a cascade neural network is implemented.

For example, the computer program may be divided into one or more modules, and the one or more modules are stored in the memory and executed by the processor to complete each module of the present invention. The one or more modules may be a series of computer instruction segments capable of performing a particular function, and the instruction segments are used to describe the execution process of the computer program in a terminal device.

The processor in the present invention may be a central processing unit (CPU), or may be other general-purpose processors, a digital signal processor (DSP), an application specific integrated circuit (ASIC), a field-programmable gate array (FPGA) or other programmable logic devices, discrete gates or transistor logic devices, discrete hardware components, and the like. The general-purpose processor may be a microprocessor or the processor may be any conventional processor, or the like. The processor is a control center of the terminal device, and uses various interfaces and lines to connect various parts of the entire terminal device.

The memory may be configured to store a computer program and/or a module, and the processor implements various functions of the terminal device by running or executing the computer program and/or the module stored in the memory and invoking data stored in the memory. The memory may mainly include a program storage region and a data storage region, where the program storage region may store an operating system, application programs required for at least one function (such as a sound playing function and an image playing function), and the like; and the data storage region may store data (such as audio data and an address book) and the like created according to the use of a mobile phone. In addition, the memory may include a high-speed random access memory, and may further include a non-volatile memory, such as a hard disk, an internal memory, a plug-in hard disk, a smart media card (SMC), a secure digital (SD) card, a flash card, at least one magnetic disk memory device, a flash memory device or other volatile solid-state memory devices.

Computer-readable storage medium:

The computer program stored in the computer apparatus may be stored in a computer-readable storage medium if implemented in the form of a software functional unit and sold or used as an independent product. Based on such understanding, all or some processes in the method of the foregoing embodiment of the present invention are implemented, or may be completed by instructing related hardware through a computer program. The computer program may be stored in a computer-readable storage medium, and when the computer program is executed by a processor, each step of the foregoing attention detection method based on a cascade neural network can be implemented.

The computer program includes computer program code, and the computer program code may be in the form of source code, in the form of object code, an executable file or in some intermediate forms, or the like. The computer-readable storage medium may include any entity or apparatus capable of carrying computer program code, a recording medium, a USB flash disk, a mobile hard disk, a magnetic disk, an optical disk, a computer memory, a read-only memory (ROM), a random access memory (RAM), electrical carrier signals, telecommunications signals, a software distribution medium, and the like. It should be noted that the content contained in the computer-readable storage medium may be appropriately increased or decreased according to requirements of legislation and patent practice in a jurisdiction. For example, in some jurisdictions, according to legislation and patent practice, the computer-readable storage medium does not include electrical carrier signals or telecommunications signals.

Finally, it should be noted that the present invention is not limited to the foregoing implementations. For example, changes in the methods of dividing a plurality of regions of interest or changes in specific processes and results of fusion analysis according to the results of recognition of a plurality of regions of interest should also fall within the protection scope of the claims of the present invention.

INDUSTRIAL APPLICABILITY

In the method of the present invention, a cascaded convolutional neural network is used for recognition. A first convolutional neural network has relatively low computational complexity and may be used to analyze a simple scenario and judge whether a first situation of inattention occurs to a driver. This can reduce the computation amount of the entire convolutional neural network, and the entire convolutional neural network model is small in size and low in computational complexity.

In addition, in the method of the present invention, the head posture information is first used to make a preliminary judgment on whether the attention is concentrated, and then the head posture and eye information is used to further detect the driver's attention. Before the driver's attention is detected, four methods are adopted to process an original image to obtain four kind regions of interest, and classification results are fused to analyze human behavior and intention. Therefore, the cascaded convolutional neural network of the present invention has good generalization performance and low computational complexity, and is suitable for an embedded device.

What is claimed is:

1. An attention detection method based on a cascade neural network, comprising:
    obtaining video data, recognizing a plurality of image frames, and extracting a face region of the plurality of image frames;
    wherein,
    recognizing the face region by using a first convolutional neural network to judge whether a first situation of inattention occurs; and
    recognizing, if it is confirmed that no first situation of inattention occurs, the face region by using a second convolutional neural network to judge whether a second situation of inattention occurs, wherein computational complexity of the first convolutional neural network is less than computational complexity of the second convolutional neural network.

2. The attention detection method based on a cascade neural network according to claim 1, wherein
    the recognizing the face region by using a second convolutional neural network comprises: capturing a plurality kind of regions of interest from the face region, and judging whether a second situation of inattention occurs according to a result of recognition of two or more kind regions of interest.

3. The attention detection method based on a cascade neural network according to claim 2, wherein
    the plurality kind of regions of interest comprise a face frame region and a face supplement region; and
    the judging whether a second situation of inattention occurs according to a result of recognition of two or more kind regions of interest comprises: judging whether a second situation of inattention occurs according to a result of image recognition of the face frame region and the face supplement region.

4. The attention detection method based on a cascade neural network according to claim 2, wherein
    the plurality kind of regions of interest comprise a face frame region and an eye region; and
    the judging whether a second situation of inattention occurs according to a result of recognition of two or more kind regions of interest comprises: judging whether a second situation of inattention occurs according to a result of image recognition of the face frame region and the eye region.

5. The attention detection method based on a cascade neural network according to claim 1, wherein
    the judging whether a first situation of inattention occurs comprises: recognizing the face region by using the first convolutional neural network, judging whether a rotation angle of the head in a preset direction is greater than a preset angle, and if so, confirming that the first situation of inattention occurs.

6. The attention detection method based on a cascade neural network according to claim 1, wherein
    the second convolutional neural network comprises a first convolution layer, a depthwise convolution layer, a plurality of bottleneck residual layers, a second convolution layer, a linear global depthwise convolution layer, a linear convolution layer, a fully connected layer and a classification layer that are sequentially cascaded.

7. The attention detection method based on a cascade neural network according to claim 6, wherein
    the bottleneck residual layer comprises a convolution unit and a depthwise convolution unit for receiving an output of the convolution unit, and is further provided with a residual unit, and the residual unit implements residual computation of the bottleneck residual layer when a step size of the convolution unit is 1.

8. The attention detection method based on a cascade neural network according to claim 1, wherein
    the recognizing a plurality of image frames after obtaining the video data comprises: selecting one image frame from every preset number of consecutive image frames of the video data for recognition.

9. A computer apparatus, comprising a processor and a memory, wherein the memory stores a computer program, and when the computer program is executed by the processor, each step of the attention detection method based on a cascade neural network according to claim 1 is implemented.

\* \* \* \* \*